(12) United States Patent
Tan et al.

(10) Patent No.: US 10,815,896 B2
(45) Date of Patent: Oct. 27, 2020

(54) IGNITER WITH PROTECTIVE ALUMINA COATING FOR TURBINE ENGINES

(71) Applicant: GENERAL ELECTRIC COMPANY, Schenectady, NY (US)

(72) Inventors: Daniel Qi Tan, Hockessin, DE (US); Shekhar Shripad Kamat, St. Augustine, FL (US); Wei Zhang, Ballston Lake, NY (US); Javier Guzman Padilla, Queretaro (MX); Santiago Blackaller Ledesma, Queretaro (MX)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 244 days.

(21) Appl. No.: 15/831,415

(22) Filed: Dec. 5, 2017

(65) Prior Publication Data
US 2019/0170066 A1    Jun. 6, 2019

(51) Int. Cl.
*F02C 7/266* (2006.01)
*H01T 13/39* (2006.01)
(Continued)

(52) U.S. Cl.
CPC .............. *F02C 7/266* (2013.01); *C22C 21/00* (2013.01); *C22C 38/18* (2013.01); *H01T 13/38* (2013.01);
(Continued)

(58) Field of Classification Search
CPC .......... F02C 7/264; F02C 7/266; H01T 13/00; H01T 13/38; H01T 13/39; H01T 13/52;
(Continued)

(56) References Cited

U.S. PATENT DOCUMENTS

| 2,470,033 A | 5/1949 | Hensel |
| 2,939,983 A * | 6/1960 | Pierce ..................... H01T 13/52 |
| | | 313/131 R |

(Continued)

FOREIGN PATENT DOCUMENTS

| EP | 0361644 A1 | 4/1990 |
| EP | 0660475 A1 | 6/1995 |

OTHER PUBLICATIONS

"446 Stainless Data Sheet", Rolled Alloys, 2012. Obtained from <https://www.rolledalloys.com/alloys/stainless-steels/446/en/> on Dec. 10, 2019. (Year: 2012).*

(Continued)

*Primary Examiner* — Alain Chau
(74) *Attorney, Agent, or Firm* — John P. Darling; The Small Patent Law Group, LLC

(57) ABSTRACT

A high temperature article, for example an igniter for a combustor is presented. The igniter includes a central electrode having a discharge end, an insulator sleeve surrounding the central electrode and a tubular electrode shell surrounding the insulator sleeve. The tubular electrode shell has a forward end projecting beyond the discharge end. The tubular electrode shell includes an iron-based alloy. The igniter further includes a protective coating including alumina disposed on a surface of the forward end. A combustor of a turbine engine, including the igniter is also presented.

15 Claims, 3 Drawing Sheets

(51) Int. Cl.
*C22C 38/18* (2006.01)
*C22C 21/00* (2006.01)
*H01T 13/38* (2006.01)
*H01T 13/52* (2006.01)

(52) U.S. Cl.
CPC .......... *H01T 13/39* (2013.01); *F05D 2220/32* (2013.01); *F05D 2230/90* (2013.01); *F05D 2240/35* (2013.01); *F05D 2300/17* (2013.01); *F05D 2300/175* (2013.01); *F05D 2300/2112* (2013.01); *F05D 2300/611* (2013.01); *H01T 13/52* (2013.01)

(58) Field of Classification Search
CPC ..... H01T 13/34; H01T 21/02; F05D 2230/90; F05D 2300/17; F05D 2300/175; F05D 2300/2112; F05D 2300/611; F23Q 3/00; F23Q 3/006; F02P 15/00; F02P 13/00
USPC ........................................................ 361/253
See application file for complete search history.

(56) References Cited

U.S. PATENT DOCUMENTS

| | | | | |
|---|---|---|---|---|
| 3,832,589 A * | 8/1974 | Pfaue | ................... | H01J 61/36 313/625 |
| 3,883,762 A * | 5/1975 | Harris | ................... | H01T 13/52 313/130 |
| 3,890,518 A * | 6/1975 | Tombs | ................... | H01T 13/39 313/130 |
| 3,968,303 A * | 7/1976 | Harris | ................... | H01T 13/52 428/332 |
| 3,970,591 A * | 7/1976 | Harris | ................... | H01T 13/52 252/521.1 |
| 3,995,184 A * | 11/1976 | Insley | ................... | H01T 13/41 313/131 A |
| 4,093,887 A | 6/1978 | Corbach et al. | | |
| 4,396,855 A * | 8/1983 | Imai | ................... | F02P 9/007 313/139 |
| 4,485,151 A | 11/1984 | Stecura | | |
| 4,489,596 A * | 12/1984 | Linder | ................... | H01T 13/18 313/137 |
| 4,692,657 A * | 9/1987 | Grunwald | ............... | H01T 13/39 313/130 |
| 4,713,574 A | 12/1987 | Scott | | |
| 4,742,265 A | 5/1988 | Giachino et al. | | |
| 4,771,209 A * | 9/1988 | Ryan | ................... | H01T 13/467 313/140 |
| 4,786,781 A * | 11/1988 | Nozaki | ................... | F23Q 7/001 123/145 A |
| 4,881,913 A | 11/1989 | Mann | | |
| 4,926,088 A * | 5/1990 | Kler | ................... | H01T 13/52 313/131 A |
| 4,951,173 A * | 8/1990 | Suzuki | ................... | H01T 13/52 313/131 A |
| 5,103,136 A * | 4/1992 | Suzuki | ................... | H01T 13/52 313/131 A |
| 5,228,932 A | 7/1993 | Shimizu et al. | | |
| 5,274,298 A * | 12/1993 | Cassidy | ................... | H01T 13/38 123/169 CL |
| 5,550,425 A * | 8/1996 | Yoder | ................... | H01T 13/39 313/131 A |
| 5,852,340 A | 12/1998 | Ito et al. | | |
| 6,076,493 A | 6/2000 | Miller et al. | | |
| 6,109,018 A | 8/2000 | Rostrup-Nielsen et al. | | |
| 6,235,370 B1 | 5/2001 | Merrill | | |
| 6,340,500 B1 | 1/2002 | Spitsberg | | |
| 6,608,543 B2 | 8/2003 | Rapoport et al. | | |
| 7,407,903 B2 | 8/2008 | Sundberg et al. | | |
| 7,581,304 B2 | 9/2009 | Lykowski | | |
| 7,727,425 B2 | 6/2010 | Jankowiak et al. | | |
| 8,003,020 B2 | 8/2011 | Jankowiak et al. | | |
| 8,237,342 B2 * | 8/2012 | Yamamura | ............... | H01T 13/52 313/141 |
| 8,243,415 B2 * | 8/2012 | Sakakura | ................ | H01T 13/52 361/247 |
| 8,492,963 B2 | 7/2013 | Ma | | |
| 8,536,770 B2 * | 9/2013 | Kameda | ................... | H01T 13/50 313/118 |
| 8,614,541 B2 | 12/2013 | Walker, Jr. | | |
| 9,115,030 B2 | 8/2015 | Drazenovic | | |
| 9,236,716 B2 * | 1/2016 | Mizutani | ................. | H01T 13/32 |
| 9,478,947 B2 * | 10/2016 | Mukoyama | ............ | H01T 13/32 |
| 2004/0080252 A1 * | 4/2004 | Ito | ........................... | H01T 13/39 313/141 |
| 2008/0050264 A1 | 2/2008 | Lykowski et al. | | |
| 2010/0212622 A1 * | 8/2010 | Cleeves | ................... | F01L 5/06 123/188.5 |
| 2011/0121712 A1 * | 5/2011 | Ma | .......................... | H01T 21/02 313/141 |
| 2011/0241523 A1 * | 10/2011 | Kameda | ................... | H01T 13/39 313/141 |
| 2015/0260107 A1 | 9/2015 | Wright | | |

OTHER PUBLICATIONS

Rager et al., "Oxidation Damage of Spark Plug Electrodes", Advanced Engineering Materials, vol. 7, Issue: 7, pp. 633-640, Jul. 29, 2005.
"39th International Conference & Exposition on Advanced Ceramics and Composites", the American Ceramic Society, Jan. 2015, Daytona Beach, Florida, 214 Pages.
Extended European Search Report dated Apr. 17, 2019 for corresponding EP Application No. 18208984.7 (7 pages).

\* cited by examiner

IGNITER WITH PROTECTIVE ALUMINA COATING FOR TURBINE ENGINES

Embodiments of the present disclosure generally relate to articles for turbine engines. More particularly, embodiments of the present disclosure relate to high temperature articles such as igniters for use in combustors of the turbine engines.

BACKGROUND

Higher operating temperatures for turbine engines are continuously sought in order to increase their efficiency. However, as operating temperatures increase, the high temperature durability of the components of the engine must correspondingly increase. Significant advances in high temperature capabilities have been achieved through formulation of high temperature alloys such as nickel, iron and cobalt-based superalloys. Further, components formed from superalloys must be provided with some form of thermal and/or environmental protection in order to exhibit adequate service lives in certain sections of a turbine engine, such as the turbine and combustor. A common solution may be to thermally insulate such components in order to minimize their service temperatures. For this purpose, oxidation-resistant coatings and thermal barrier coatings (TBC) may be formed on the exposed surfaces of high temperature components.

As an example, igniters, such as spark ignition devices or spark plugs are, generally, used in turbine engines for igniting a combustion process in a combustor containing a combustible mixture (for example, a fuel-air mixture). The ignition is produced by generating a spark across a gap between the oppositely charged electrodes of the igniter. The spark so produced may be sufficient to ignite the combustible mixture present in the combustor. After initial ignition, the igniter can be repeatedly sparked thereafter, primarily as a safety measure. In addition, the igniter may be activated when the aircraft enters a rain squall, or other situation which may disturb steady-state conditions in the combustor.

Typically, these igniters for use in the combustors, employ high temperature superalloys, for example nickel-based alloys (as discussed above) as electrode materials. However, the continuous exposure of the igniter, specially the igniter tip to the corrosive environment may cause undesirable corrosion and erosion of the igniter tip, and degrade the performance of the igniter and associated engine. Further, the corrosion and erosion of the igniter caused by the corrosive environment may be further exacerbated at higher operating temperatures because the oxidation resistance of the high temperature alloys decreases as the operating temperature increases.

There remains a need for alternative materials for improved articles, particularly igniters that withstand high temperature and corrosive environment of turbine engines for long duration.

BRIEF DESCRIPTION

In one aspect, provided herein is an article. The article includes a base body including an iron-based alloy and a protective coating disposed on a surface of the base body. The protective coating includes alumina and is in contact with the surface of the base body.

One aspect provides an igniter. The igniter includes a central electrode, an insulator sleeve surrounding the central electrode and a tubular electrode shell surrounding the insulator sleeve. The tubular electrode shell has a forward end projecting beyond the discharge end. The tubular electrode shell includes an iron-based alloy. The igniter further includes a protective coating including alumina disposed on a surface of the forward end. Another aspect is directed to a combustor of a turbine engine that includes the igniter.

These and other features, embodiments, and advantages of the present disclosure may be understood more readily by reference to the following detailed description.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
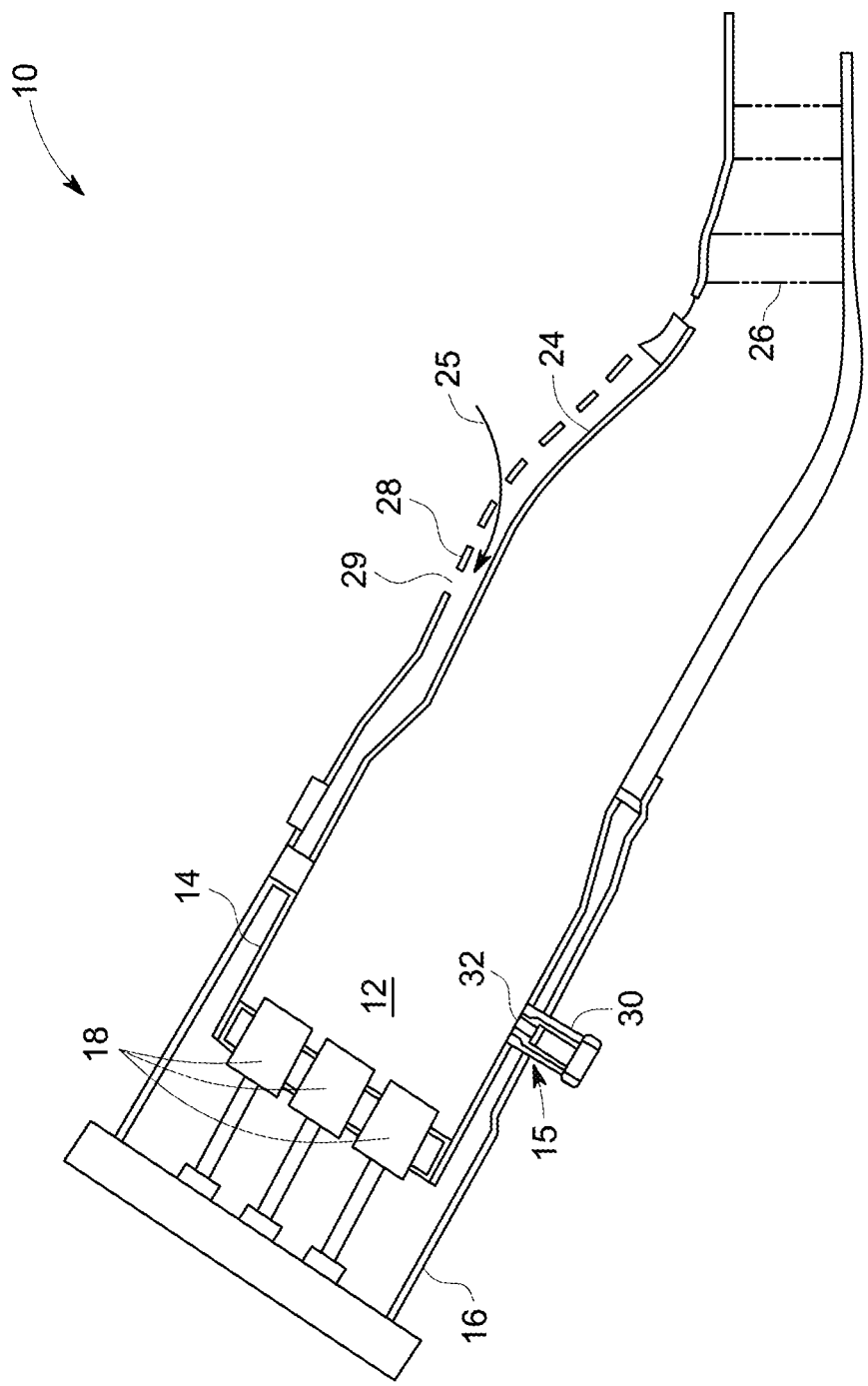
FIG. 1 is a simplified schematic of a combustor, in accordance with one embodiment of the disclosure.

The present disclosure encompasses embodiments of high temperature articles i.e., articles for use in high temperature environment of turbine engines. Some embodiments provide an improved igniter for use in the combustors of turbine engines. The igniter as described herein has improved stability in high temperature environments of combustors of turbine engines.

In the following specification and the claims, the singular forms "a", "an" and "the" include plural referents unless the context clearly dictates otherwise. Approximating language, as used herein throughout the specification and claims, may be applied to modify any quantitative representation that could permissibly vary without resulting in a change in the basic function to which it is related. Accordingly, a value modified by a term or terms, such as "about" and "substantially", is not limited to the precise value specified. In some instances, the approximating language may correspond to the precision of an instrument for measuring the value.

As used herein, the term "high temperature" refers to an operating temperature of a turbine engine. In some embodiments, the operating temperature of the turbine engine is higher than 1000 degrees Celsius. In some embodiments, the operating temperature is in a range of from about 1200 degrees Celsius to 2000 degrees Celsius. As used herein, the term "high temperature environment" refers to high temperature and corrosive environment of a combustor in a turbine engine.

Some embodiments of the present disclosure are directed to an article that includes a base body including an iron-based alloy and a protective coating including alumina disposed on a surface of the base body, where the protective coating is in contact with the surface of the base body. In some embodiments, the protective coating is free of a bond coat. In some embodiments, the protective coating is alumina coating. In some embodiments, the base body is composed of an iron-based alloy, and an alumina coating is disposed in contact with the surface of the base body.

The term "superalloy", as used herein, is applied to alloys which have outstanding high temperature strength and oxidation resistance. The terms "alloy" and "superalloy" are interchangeably used in the specification.

As used herein, the term "protective coating" refers to those coating systems which provide protection from high temperature environment, i.e., function as barriers in protecting against environmental and thermal attack caused by, for example, high temperature, aqueous environments, such as steam, various corrodants, i.e., provide corrosion resistance, etc. In some embodiments, the protective coating includes a thermal barrier coating.

As used herein, the term "bond coat" refers to any bond coat layer that promotes or improves adhesion of the overlaying thermal barrier coating or environmental barrier coating to an underlying metallic substrate for example, containing a superalloy.

In some embodiments, an igniter for a combustor of a turbine engine is provided. The igniter may be used for creating a spark in the combustor of the turbine engine. The igniter includes a central electrode having a discharge end, an insulator sleeve surrounding the central electrode and a tubular electrode shell surrounding the insulator sleeve. That is, the insulator sleeve is disposed between the central electrode and the tubular electrode shell. The tubular electrode shell has a forward end projecting beyond the discharge end of the central electrode. The tubular electrode shell includes an iron-based alloy. In some embodiments, the iron-based alloy includes chromium, aluminum, or a combination thereof. The igniter further includes a protective coating including alumina disposed on a surface of the forward end. In some embodiments, the protective coating is in contact with the surface of the forward end. In certain embodiments, the protective coating is alumina coating.

FIG. 1 shows a simplified cross-section view of a combustor 10, such as may be included in a turbine engine, according to some embodiments of the present disclosure. As shown, the combustor 10 may include a combustion chamber 12 formed by a combustor liner 14 disposed within a casing 16. As shown, one or more nozzles 18 are radially arranged to provide fuel into the combustion chamber 12. The combustion chamber 12 connects to a turbine inlet 26 through a transition piece 24. An impingement sleeve 28 with flow holes 29 may surround the transition piece 24 to define an annular passage 25 between the impingement sleeve 28 and the transition piece 24. A compressed working fluid may pass through the flow holes 29 of the impingement sleeve 28 to flow through the annular passage 25 to provide convective cooling to the transition piece 24 and the combustor liner 14. As shown in FIG. 1, the combustor 10 may further include an igniter 30 for igniting the fuel-air mixture inside the combustion chamber 12. The igniter 30 is located radially outward with an igniter tip 32 protruding into the combustion chamber 12 through a bore 15 provided in the casing 16 and the combustor liner 14 to project a spark into the combustion chamber 12. A seal (not shown in FIG. 1) may be provided between the igniter 30 and the casing 16 to prevent any leakage therethrough.

Figure 2:
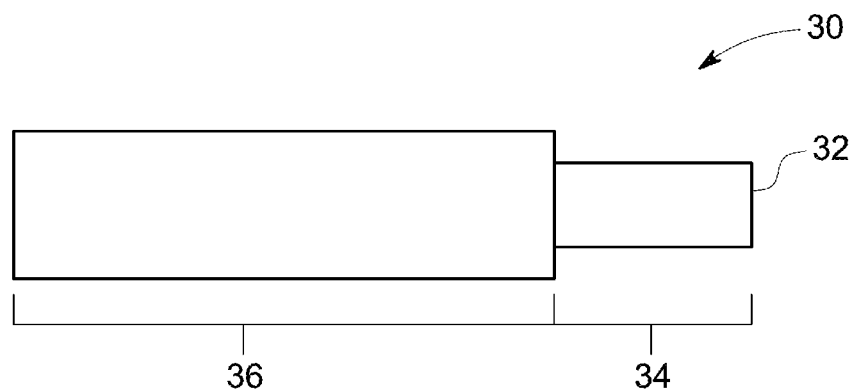
FIG. 2 is a schematic of an igniter, in accordance with one embodiment of the disclosure.

FIG. 2 shows a perspective view of the igniter 30. The igniter 30 may have an elongated, substantially cylindrical body with multiple sections of varying diameters. As shown, the igniter 30 has a body section 36 and an ignition section 34 that extends from the body section 36 and includes the igniter tip 32. The ignition section 34 is coaxial with the body section 36 and has reduced diameter than the body section 36.

Figure 3:
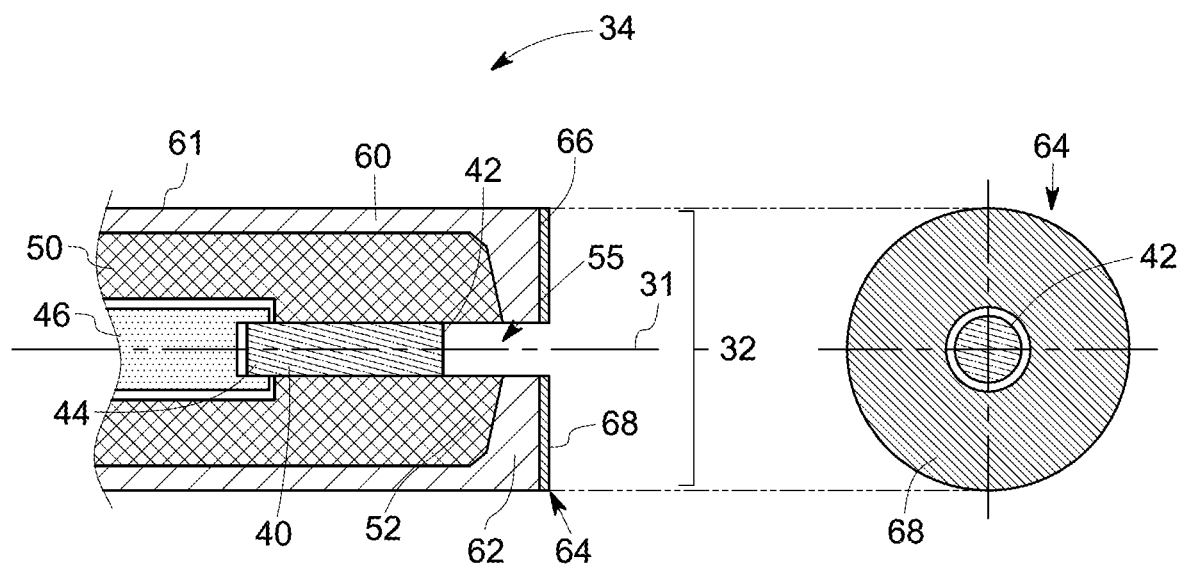
FIG. 3 is a simplified cross-sectional view of an igniter tip of an igniter, in accordance with one embodiment of the disclosure.

FIG. 3 shows a cross section view of the ignition section 34. The ignition section 34 includes a central electrode 40, an insulator sleeve 50 surrounding the central electrode 40 and a tubular electrode shell 60 surrounding the insulator sleeve 50. That is, the insulator sleeve 50 is disposed between the central electrode 40 and the tubular electrode shell 60. The central electrode 40 may be bar-shaped. The central electrode 40 extends along an axis 31 of the igniter 30 and has a discharge end 42. The insulator sleeve 50 concentrically surrounds the central electrode 40 and the tubular electrode shell 60 concentrically surrounds the insulator sleeve 50.

Referring to FIGS. 2 and 3, the tubular electrode shell 60 and the insulator sleeve 50 extend along the axis 31 beyond the ignition section 34, to the body section 36 having increased diameters in the body section 36. The central electrode 40 may not extend beyond the ignition section 34 of the igniter 30. An end 44 opposite to the discharge end 42 of the central electrode 40 may be serially connected to a support bar/pin 46 extending in the body section 36 of the igniter 30.

As illustrated in FIG. 3, the tubular electrode shell 60 has a forward end 62. The forward end 62 projects beyond the discharge end 42 of the central electrode 40. The forward end 62 and the discharge end 42 define a gap 55. The forward end 62 may project beyond the discharge end 42 by a distance less than 10 millimeters. In some embodiments, the distance may be up to 8 millimeters. In some embodiments, the distance may range between about 1 millimeter to about 7 millimeters. The forward end 62 of the tubular electrode shell 60 has a peripheral portion 64 having an increased wall thickness. The increased wall thickness of the forward end 62 can cover an end portion 52 of the insulator sleeve 50. In some embodiments, the peripheral portion 64 has a wall thickness more than double the wall thickness of the remaining portion of the tubular electrode shell 60. The tubular electrode shell 60 may have a wall thickness in a range from about 1 millimeter to about 5 millimeters depending on the application. In some embodiments, the wall thickness of the tubular electrode shell 60 is in a range from about 3 millimeters to about 3.5 millimeters. In these embodiments, the peripheral portion 64 of the forward end 62 may have a wall thickness in a range from about 3 millimeters to about 8 millimeters.

Referring to FIGS. 2 and 3 again, the tubular electrode shell 60 may be electrically grounded and the central electrode 40 may be connected to an energy source (not shown in figures) so that an electric charge may be conveyed to create a spark across the gap 55 during the operation of the igniter 30.

The components of the ignition section 34 of the igniter 30, i.e., the central electrode 40, the tubular electrode shell 60 and the insulator sleeve 50, includes materials capable of withstanding the thermal load of the combustion chamber 12 (FIG. 1). Both the central electrode 40 and the tubular electrode shell 60 may be composed of electrically-conductive materials. The insulator sleeve 50 may include an electrical insulating material that is provided to electrically insulate the central electrode 40 from the tubular electrode shell 60. Suitable electrical insulating materials include, but are not limited to, alumina, beryllium oxide, silicon nitride or a combination thereof. In some other embodiments, the insulator sleeve 50 may include a semiconductor material such as silicon carbide.

The electrically conductive materials may include a metal or an alloy of the metal selected from the group consisting of nickel, iron, cobalt, titanium, gold, platinum, iridium, rhodium, palladium and a combination thereof, that withstand high temperatures. The additional alloying elements may include chromium, manganese, copper, aluminum, zirconium, tungsten and rare earth elements including yttrium, hafnium, lanthanum, or cerium. Suitable examples of the electrically conductive materials include, but are not limited to, high temperature alloys such as nickel-based alloys, cobalt-based alloys, iron-based alloys or a combination thereof. These alloys may also include superalloys.

In some embodiments, the tubular electrode shell 60 includes an iron-based alloy. The iron-based alloy may be a superalloy. In addition to iron, the iron-based alloy may further include chromium, aluminum or a combination thereof. In certain embodiments, the tubular electrode shell 60 is composed of an iron-based alloy including chromium and aluminum. In some embodiments, the amount of each constituent by weight in the iron-based alloy is as follows: about 15% to about 27% chromium, about 4% to about 10% aluminum and the balance substantially iron. In some embodiments, the iron-based alloy includes about 18% to about 24% by weight chromium, about 4% to about 6% by weight aluminum and about 65% to about 75% by weight iron. A suitable example of such an alloy is Kanthal APM™, which is commercially available from Sandvik. Other examples include, but are not limited to, ALKROTHAL® 14 (commercially available from Sandvik).

In some embodiments, the central electrode 40 includes a metal or a metal alloy of nickel, iron, iridium, or ruthenium. In some embodiments, the central electrode 40 is composed of iridium or ruthenium. In some embodiments, the central electrode 40 is composed of a nickel-based superalloy. Examples include INCONEL® alloy and HASTELLOY® alloy. In certain embodiments, the central electrode 40 is composed of an iron-based alloy (as described previously). Examples include, but are not limited to, Kanthal APM™ and ALKROTHAL® 14 (commercially available from Sandvik). The support bar/pin 46 may be composed of an electrically conductive material different from the central electrode 40 for economic purposes. In some embodiments, the support bar/pin 46 includes a metal or a metal alloy. Examples include a nickel-based alloy such as Kovar®. In some embodiments, both the central electrode 40 and the tubular electrode shell 60 are composed of Kanthal APM™.

In some embodiments, as illustrated in FIG. 3, a protective coating 68 is disposed on an outer surface 66 (that is exposed to the high temperature environment of the combustion chamber 12, FIG. 1) of the peripheral portion 64 of the forward end 62 of the igniter 30. In some embodiments, the protective coating 68 includes a thermal barrier coating. In some embodiments, the protective coating 68 is free of a bond coat. In certain embodiments, the protective coating 68 includes alumina. In certain embodiments, the protective coating 68 is in contact of the outer surface 66 of the peripheral portion 64. That is, the protective coating 68 including alumina is directly disposed on the outer surface 66. In certain embodiments, the protective coating 68 is alumina coating.

Typically, an article for use in a high temperature environment of a turbine engine is composed of a high temperature alloy and coated with a protective coating on an outer surface of the article. The protective coating typically includes a thermal barrier coating such as yttria stabilized zirconia (YSZ) coating that is usually applied over a bond coat. That is, the bond coat is first applied on the outer surface of the article and the YSZ coating is disposed on the bond coat. The bond coat helps the thermal barrier coating to adhere with the base alloy.

However, the present disclosure provides a protective coating that can be applied on an article composed of an iron-based alloy without a bond coat. Without being bound by any theory, it is believed that the use of alumina (as the protective coating) on a surface of an article including iron-based alloy containing aluminum (for example, Kanthal APM™) is compatible with the aluminum oxide that is formed on the surface naturally. It has been observed by the inventors of the present disclosure that a protective coating of alumina can be applied on a surface of an article, for example a tip portion of an igniter composed of Kanthal APM™ alloy without a bond coat, and such article shows improved stability in high temperature environment of a combustor.

Figure 4:
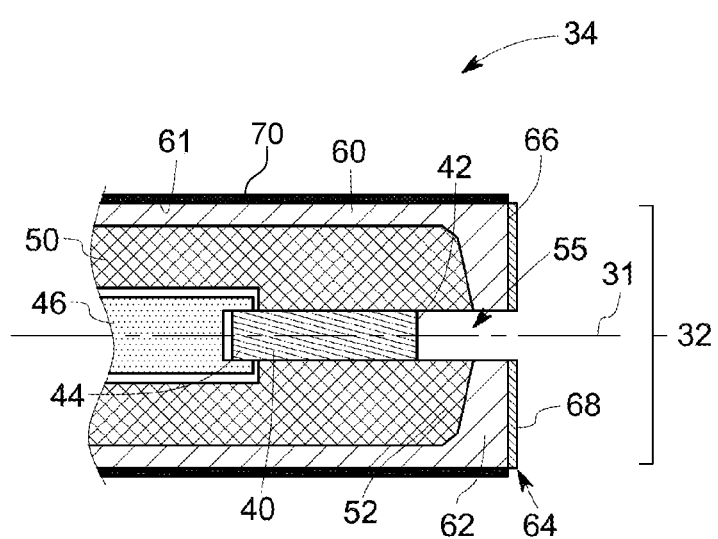
FIG. 4 is a simplified cross-sectional view of an igniter tip of an igniter, in accordance with another embodiment of the disclosure.

In some embodiments, an outer surface 61 of the tubular electrode shell 60, which is not directly exposed to the high temperature environment of the combustor 10, is coated with a wear-resistance coating 70 as shown in FIG. 4. The wear-resistance coating 70 may include a wear-resistant material that is compatible with the iron-based alloy of the tubular electrode shell 60. In some embodiments, the wear-resistant material includes alumina, chromium carbide, or a combination thereof.

In some embodiments, the igniter tip 32 further includes iridium. Iridium may be inserted in the forward end 62 in form of powder, flakes, beads, wires, or the like. Use of iridium at the forward end may help in achieving longer life of the igniter by lowering erosion rate during sparking as compared to an igniter having a forward end that does not have iridium.

While only certain features of the disclosure have been illustrated and described herein, many modifications and changes will occur to those skilled in the art. It is, therefore, to be understood that the appended claims are intended to cover all such modifications and changes as fall within the true spirit of the invention.

The invention claimed is:

1. An igniter, comprising:
   a central electrode having a discharge end;
   an insulator sleeve surrounding the central electrode;
   a tubular electrode shell surrounding the insulator sleeve and having a forward end projecting beyond the discharge end, wherein the tubular electrode shell comprises an iron-based alloy;
   a protective coating comprising alumina disposed on an outer surface of the forward end of the tubular electrode shell, wherein the protective coating is in contact with the outer surface; and
   a wear-resistant coating disposed on a peripheral outer surface of the tubular electrode shell.

2. The igniter of claim 1, wherein the iron-based alloy comprises chromium, aluminum, or a combination thereof.

3. The igniter of claim 2, wherein the iron-based alloy comprises:
   chromium in an amount from about 15% by weight to about 27% by weight, and aluminum in an amount from about 4% by weight to about 10% by weight.

4. The igniter of claim 1, wherein the forward end projects less than 10 millimeters beyond the discharge end.

5. The igniter of claim 4, wherein the forward end projects between about 1 millimeter to about 7 millimeters beyond the discharge end.

6. The igniter of claim 1, wherein the forward end further comprises iridium.

7. The igniter of claim 1, wherein the central electrode comprises a nickel-based alloy, an iron-based alloy, a cobalt-based alloy, or a combination thereof.

8. The igniter of claim 1, wherein the wear-resistant coating comprises alumina, chromium carbide, or a combination thereof.

9. The igniter of claim 1, wherein the insulator sleeve comprises an electrical insulating material selected from the group consisting of alumina, beryllium oxide, silicon nitride or a combination thereof.

10. A combustor of a turbine engine, comprising the igniter of claim 1.

11. The igniter of claim 1, wherein the forward end comprises a peripheral portion having a wall thickness at least double a wall thickness of a remaining portion of the tubular electrode shell, wherein the peripheral portion of the forward end of the tubular electrode shell covers an end portion of the insulator sleeve.

12. The igniter of claim 11, wherein the remaining portion of the tubular electrode shell has a thickness in a range from about 1 millimeter to about 5 millimeters.

13. The igniter of claim 1, wherein the central electrode comprises a first electrically-conductive material including a metal or alloy of the metal selected from the group consisting of nickel, iron, cobalt, titanium, gold, platinum, iridium, rhodium, ruthenium, palladium, and a combination thereof, wherein additional alloying elements of the first electrically-conductive material comprise chromium, manganese, copper, aluminum, zirconium, tungsten, yttrium, hafnium, lanthanum, or cerium.

14. The igniter of claim 13, further comprising a support bar serially connected to a second end of the central electrode opposite the discharge end, the support bar comprising a second electrically conductive material different from the first electrically-conductive material.

15. The igniter of claim 14, wherein the second electrically-conductive material is a nickel-based alloy.

* * * * *